Patented June 23, 1942

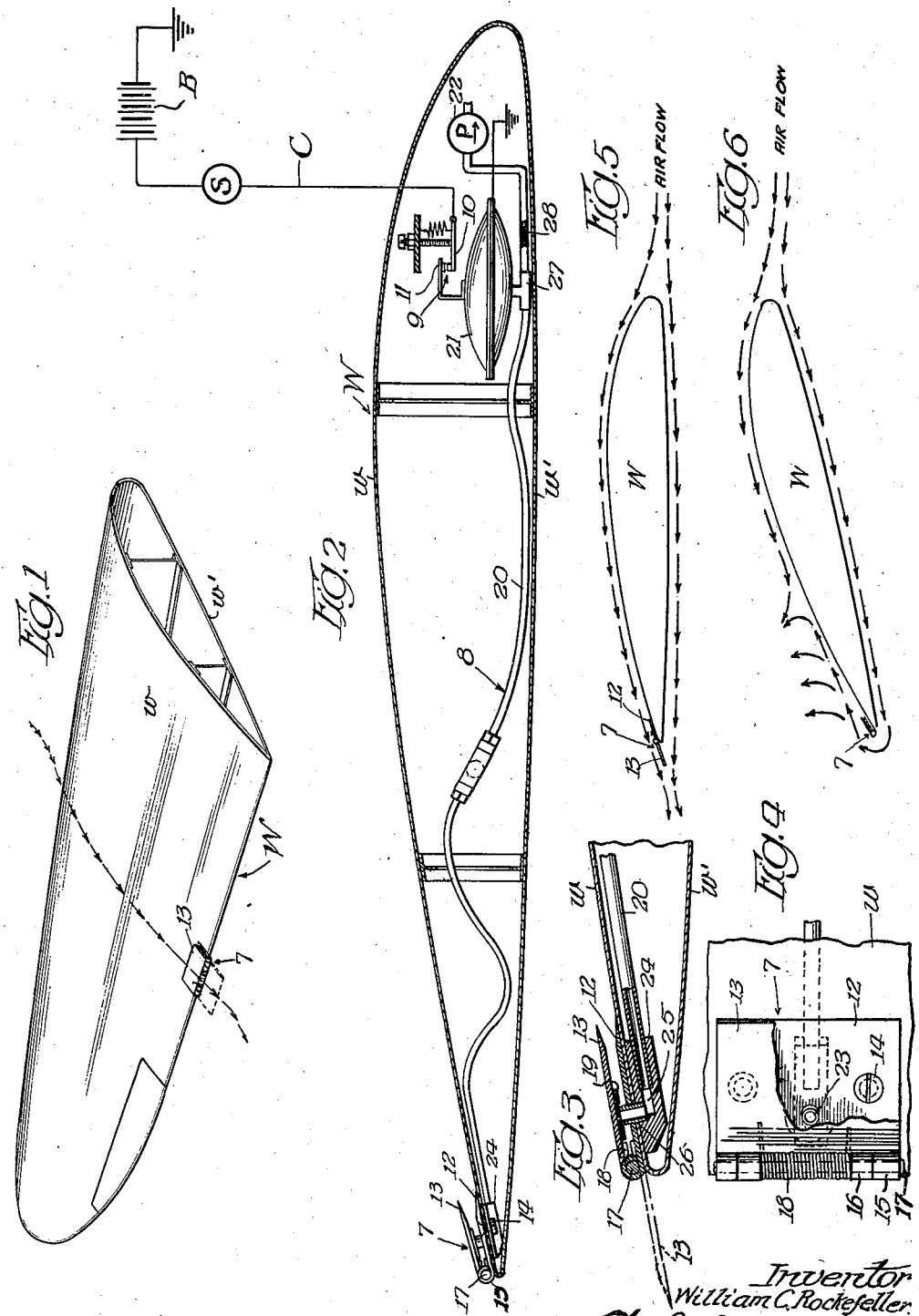

2,287,497

UNITED STATES PATENT OFFICE 2,287,497

STALL WARNING INDICATOR

William C. Rockefeller, Pasadena, Calif., assignor to Vultee Aircraft, Inc., Vultee Field, Calif., a corporation of Delaware Application February 24, 1941, Serial No. 380,110

6 Claims. (Cl. 177—311)

The present invention pertains and has reference to an airplane stall warning indicator, that is, an indicator which serves during flight of the airplane with which it is associated to warn the pilot of an approaching or impending stall in order that he may act in time to prevent the stall and its ensuing hazard.

One object of the invention is to provide an indicator of this type or character which is generally an improvement upon, and has certain inherent advantages over, previously designed stall warning indicators and is characterized by the fact that it effectively and efficiently fulfills its intended function and is extremely simple in construction or design.

Another object of the invention is to provide an airplane stall warning indicator which comprises a small hinge, one part of which is fixed to the trailing edge of the wing of the airplane and the other part of which is pivotally connected or hinged to the one part in such manner that when the airplane is in an unstalled condition or attitude of flight it assumes a trailing or open position due to the rearward flow of air over the top surface of the wing and when the airplane approaches a stalled condition or attitude of flight it is caused to swing forwards into a closed position in response to the forward flow of air over the top portion of the trailing edge of the airplane.

A further object of the invention is to provide a stall warning indicator which may be manufactured at a low and reasonable cost and is of such design that it does not materially increase the weight of the airplane with which it is associated.

Other objects of the invention and the various advantages and characteristics of the present airplane stall warning indicator will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a fragmentary perspective view of an airplane wing having applied thereto a stall warning indicator embodying the invention;

Figure 2 is an enlarged section of the wing illustrating in detail the construction and manner of mounting of the hinge and showing diagrammatically the signal in the pilot's compartment and the suction responsive means for actuating the signal when the movable part of the hinge is in its closed position;

Figure 3 is an enlarged section of the hinge;

Figure 4 is a plan view of the hinge, a portion of the movable part being broken away for purposes of illustration;

Figure 5 is a diagrammatic view illustrating the manner in which the air stream which flows rearwards over the top surface of the wing when the airplane with which the indicator is employed is flown at a normal attitude, that is, in an unstalled flight condition, operates to hold the movable part of the hinge in its open or trailing position; and Figure 6 is a diagrammatic view illustrating the manner in which the movable part of the hinge is caused to swing forwards into its closed position in response to the action of the air which flows forwardly over the trailing edge of the wing when the airplane approaches a stalled flight condition.

The indicator which is shown in the drawing constitutes the preferred form or embodiment of the invention. It is designed to be used with an airplane (not shown) having a wing W and operates as hereinafter described to warn the pilot of an approaching or impending stall in order that he may act in time to prevent the stall. The wing W is of conventional or standard design and comprises fore and aft longitudinally extending spars and in addition a convex top skin $w$ and a substantially straight bottom skin $w^1$. The leading edge or portion of the wing is curved or rounded and the trailing edge or portion is tapered or wedge shaped. As its parts the indicator comprises a signal S, a small valve type hinge 7, and signal actuating means 8 under the control of the hinge 7.

The signal S is of the electric variety and is preferably either in the form of a light or a horn. It is disposed in the pilot's compartment of the airplane and is included in an electrical circuit comprising a battery B and a conductor C. If the signal is in the form of a light it is preferably mounted on the instrument panel or board of the airplane in such manner that it is within the range of vision of the pilot. If the signal is in the form of a horn or other audible device it is mounted in the pilot's compartment as close as possible to the pilot's seat. The conductor C includes a switch 9 and this consists of a fixed conductor 10 and a movable contact 11. When the switch is closed current from the battery B flows through and operates the signal. When the switch 9 is in its open position as the result of the movable contact 11 being out of contact with the fixed contact 10 there is no flow of current through the signal S and the latter is inoperative.

The valve type hinge 7 is mounted on the upper portion of the trailing edge of the wing W, It serves, as hereinafter described, as the controlling medium for the signal actuating means 8 and consists of a fixed or stationary part 12 and a movable part 13. The fixed part is in the form of a rectangular metallic plate and is anchored to the top skin w of the wing by way of bolts 14. It is positioned directly adjacent the trailing edge of the wing, as shown in the drawing, and embodies along the rear edge thereof up-turned cylindrical ears 15. The movable part 13 of the hinge, like the fixed part, is in the form of a rectangular plate. It corresponds in size to the fixed part and has along one margin thereof laterally extending cylindrical ears 16. These ears are longitudinally aligned with the ears 15 and together with a pivot pin 17 and the ears 15 form a pivot whereby the part 13 is mounted so that it is free to swing back and forth between an open or trailing position wherein it is disposed behind and in substantially the same plane as the fixed part 12 and not only projects rearwards of the trailing edge of the wing but also is substantially coplanar with the adjacent portion of the top surface or skin of the wing, and a closed position wherein it extends forwards and overlies the fixed part, as shown in full lines in Figures 1 to 4, inclusive. The pin 17 extends through the ears 15 and 16 and is suitably secured against axial displacement. When the airplane with which the indicator is employed or associated is flying at a normal attitude, that is in an unstalled condition, air flows rearwards over the top surface of the wing, as shown in Figure 5, and operates to hold the movable part 13 in its open or trailing position. When the airplane approaches a stalled condition air travels forwardly over the top portion of the trailing edge of the wing, as shown by arrows in Figure 6, and causes the movable part 13 of the valve type hinge to swing forwards into its closed position. A spiral spring 18 surrounds the central part of the pivot pin 17 and is arranged and designed so that it urges the movable part 13 into its closed position. This spring is not sufficient, as far as its force is concerned, to cause the movable part 13 to swing into its closed position during normal flight of the airplane. It serves primarily to swing the movable part into its closed position when the airplane is at rest. The front margin of the fixed plate of the hinge is chamfered or beveled in such manner that the air striking thereagainst flows rearwards and slightly upwards. As a result of the chamfer or bevel the movable part 13 of the hinge is caused to swing readily and quickly into its open or trailing position during the take-off of the airplane. The portion of the free or distal margin of the movable part 13 that faces downwards when such part is in its closed position is also beveled or chamfered for the same reason. A pad 19 of rubber, leather, "Neoprene" or other sealing material is suitably secured to the central portion of the movable part 13 and is positioned so that it faces downwards in the direction of the fixed part 12 when the movable part is in its closed position.

The means 8 for actuating the signal S in response to control movements of the valve type hinge 7 includes the signal circuit (battery B and conductor C) and in addition includes a suction tube 20 and a bellows 21. The tube 20 is disposed in the wing W, as shown in Figure 2, and has one end thereof connected to the suction side of a pump 22. The other end of the tube leads to, and communicates with, a nipple 23 by way of a fitting 24. The fitting is mounted within the interior of the trailing edge of the wing and is anchored or fixed in place by way of the bolts 14. It is formed of any suitable light material and has an L-shaped duct 25. The end of the suction tube 20 that is remote from the pump 22 fits within one end of the duct 25, as shown in Figure 3. The nipple 23 fits within the other end of the duct and extends upwards through aligned holes 26 in the central portion of the fixed part 12 of the hinge and the subjacent portion of the top skin w of the wing W. The upper or outer end of the nipple is so arranged that it is engaged and closed by the pad 19 when the movable part 13 of the hinge is in its closed position. When the movable part 13 is in its open position air is permitted to flow through the tube 20 to the pump 22 whereas when the movable part is in its closed position the inlet end of the tube is closed against entry of air, hence suction is developed within the tube. The bellows 21 is connected to the tube 20 by way of a T fitting 27. This fitting is located at a point between the pump 22 and the fitting 24 and establishes communication between the bellows interior and the interior of the tube 20. When the movable part 13 of the hinge is in its open position the interior of the bellows is under atmospheric pressure and the bellows assumes a normal or expanded position. When the movable part 13 is in its closed position suction is created within the bellows with the result that the bellows contracts. The movable contact 11 of the switch 9 is connected to the bellows 21, as illustrated in Figure 2. It is so arranged that it is in spaced relation with the fixed contact 10 when the bellows is in its normal or expanded condition and is brought into contact with the fixed contact when the bellows is contracted due to closing of the suction tube 20 by engagement of the pad 19 with the outer end of the nipple 23. When the bellows contracts, due to closing of the suction tube, the switch 9 is automatically closed with the result that current flows to, and effects operation of, the signal S. A restriction 28 is formed in the suction tube 20 at a point between the T fitting and the pump 22 in order to prevent an exorbitant amount of air from flowing through the tube when the movable part 13 of the hinge 7 is in its open position.

The operation of the indicator is as follows: When the airplane with which the indicator is associated is flying normally, i. e., in an unstalled condition, the movable part 13 of the hinge 7 is held or maintained in its open position due to the rearward flow of air over the upper surface of the wing. When such movable part is in its open position the interior of the bellows is under atmospheric pressure with the result that the bellows is in its normal or expanded position and the switch 9 is open. While the switch is open no current flows from the battery B through the signal S and hence the signal is ineffective or inoperative. As soon as the airplane approaches a stalled condition air flows forwards over the upper portion of the trailing edge of the wing and causes the movable part 13 of the hinge to swing forwards into its closed position. As soon as the pad 19 on the central portion of the movable part 13 is brought into sealing engagement with the nipple 13 the suction pump 22 creates a vacuum within the bellows 21 and causes the bellows to contract and close the switch 9. As soon as the switch is closed current from the battery B flows to and energizes the signal S, thus apprising the pilot of the airplane of the fact that his ship is approaching a stalled or unstable condition or attitude of flight.

The herein described stall warning indicator is simple in design or construction and hence may be produced at a reasonably low cost. It is light in weight and effectively and efficiently fulfills its intended purpose or function. By reason of the fact that the hinge 7 includes the spring 18 the movable part of the hinge is in an out-of-the-way position when the airplane is at rest.

Whereas the valve type hinge 7 has been shown as being applied to a fixed portion of the trailing edge of the wing W it is to be understood that it may be mounted on a movable portion, such for example, as a landing flap or aileron. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. In combination with an airplane having a wing, a stall indicator comprising a flap-like plate disposed adjacent the trailing edge of the wing and hinged along one margin thereof and about an axis substantially coincident with said trailing edge so that in response to rearward flow of air over the wing during normal flight condition of the airplane it swings rearwards into a trailing position wherein it projects rearwards beyond the trailing edge of the wing and is substantially coplanar with the adjacent portion of the top surface of said wing and in response to forward flow of air over the trailing edge of the wing due to the airplane approaching a stalled flight condition it swings forwards into an indicating position wherein it overlies said adjacent portion of the top surface of the wing.

2. In combination with an airplane having a wing, a stall indicator comprising a flap-like plate disposed adjacent the trailing edge of the wing and hinged along one margin thereof and about an axis substantially coincident with said trailing edge so that in response to rearward flow of air over the trailing edge during normal flight condition of the airplane it swings rearwards into a trailing position wherein it projects rearwards of said trailing edge and is substantially coplanar with the adjacent portion of the top surface of the wing and in response to forward flow of air over the trailing edge of the wing due to the airplane approaching a stalled flight condition it swings forwards into an indicating position wherein it overlies said adjacent portion of the top surface of the wing, and spring means applied to the plate and arranged so that it urges said plate forwards.

3. In combination with an airplane having a wing, a stall indicator comprising a hinge embodying a first plate rigidly attached to the top surface of the wing at a point adjacent the trailing edge of the latter and a second plate pivoted or hinged along one margin thereof to the first plate so that it is free to pivot about an axis in substantially parallel relation with the trailing edge, arranged and adapted so that it swings rearwards into an open or trailing position in response to rear flow of air over the wing during normal flight condition of the airplane and forwards into a closed position over said first plate in response to forward flow of air over the trailing edge of the wing due to the airplane approaching a stalled flight condition, and having the portion of the free or distal margin thereof that faces downwards when the second plate is in its closed position beveled or chamfered.

4. In combination with an airplane having a wing, a stall indicator comprising a hinge embodying a first plate rigidly attached to the top surface of the wing at a point adjacent the trailing edge of the latter and having the upper portion of its leading margin beveled or chamfered, and a second plate hinged along one margin thereof to the trailing margin of the first plate so that it is free to pivot or swing about an axis in substantially parallel relation with said trailing edge and arranged and designed so that in response to rear flow of air over the wing during normal flight condition of the airplane it swings rearwards into a trailing position wherein it is substantially coplanar with the adjacent portion of the top surface of the wing and in response to forward flow of air over the trailing edge of the wing due to the airplane approaching a stalled flight condition it swings forwards into a closed or indicating position wherein it overlies said first plate.

5. In combination with an airplane having a wing, a stall indicator comprising a hinge embodying a first plate rigidly attached to the top surface of the wing at a point adjacent the trailing edge of the latter and having the upper portion of the leading margin thereof beveled or chamfered, a second plate hinged along one margin thereof to the trailing margin of the first plate so that it is free to pivot or swing about an axis in substantially parallel relation with said trailing edge, arranged and adapted so that in response to rear flow of air over the wing during normal flight of the airplane it swings rearwards into an open or trailing position wherein it is substantially coplanar with the adjacent portion of the top surface of the wing and in response to forward flow of air over the trailing edge of the wing due to the airplane approaching a stalled flight condition it swings forwards into a closed position over the first plate, and having the portion of the free or distal margin thereof that faces downwardly when the second plate is in its closed position beveled or chamfered, and a spring arranged to urge the second plate into its closed position.

6. In combination with an airplane having a wing, a stall indicator comprising a signal for the pilot of the airplane, a rigid flap-like plate disposed adjacent the trailing edge of the wing and hinged along one margin thereof and about an axis in substantially parallel relation with said trailing edge so that in response to rearward flow of air over the wing during normal flight condition of the airplane it swings rearwards into a trailing position and in response to forward flow of air over the trailing edge of the wing due to the airplane approaching a stalled flight condition it swings forwards into a position wherein it overlies the top surface of the wing, and means for operating the signal upon forward swing of the plate.

WILLIAM C. ROCKEFELLER.